(12) United States Patent
Kim (10) Patent No.: US 8,720,623 B1
(45) Date of Patent: May 13, 2014

(54) IN-WHEEL MOTOR SYSTEM

(71) Applicant: Hyundai Mobis Co., Ltd., Seoul (KR)

(72) Inventor: Dong Hyun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/739,873

(22) Filed: Jan. 11, 2013

(30) Foreign Application Priority Data

Nov. 12, 2012 (KR) ........................ 10-2012-0127394

(51) Int. Cl.
*B60K 1/00* (2006.01)

(52) U.S. Cl.
USPC ........................................... 180/65.51

(58) Field of Classification Search
USPC .............. 180/65.51, 291, 55, 65.1, 65.6, 242, 180/243, 308; 903/906; 310/52
See application file for complete search history.

(56) References Cited

U.S. PATENT DOCUMENTS

| | | | |
|---|---|---|---|
| 5,127,485 A | | 7/1992 | Wakuta et al. |
| 5,155,908 A * | | 10/1992 | Arndt et al. ............... 29/888.025 |
| 7,216,731 B2 * | | 5/2007 | Kakinami et al. ......... 180/65.51 |
| 7,641,010 B2 * | | 1/2010 | Mizutani et al. .......... 180/65.51 |
| 7,703,780 B2 | | 4/2010 | Mizutani et al. |
| 7,828,095 B2 * | | 11/2010 | Murata et al. .............. 180/65.51 |
| 7,950,483 B2 * | | 5/2011 | Murata ....................... 180/65.51 |
| 7,975,789 B2 * | | 7/2011 | Murata ....................... 180/65.51 |
| 8,122,987 B2 * | | 2/2012 | Murata et al. ............. 180/65.51 |
| 8,245,803 B2 * | | 8/2012 | Murata et al. ............. 180/65.51 |
| 8,261,866 B2 * | | 9/2012 | Ishida et al. ................ 180/65.6 |
| 2008/0035399 A1 * | | 2/2008 | Murata et al. ................ 180/65.5 |
| 2008/0035407 A1 * | | 2/2008 | Murata et al. ................. 180/308 |
| 2008/0036284 A1 * | | 2/2008 | Murata ........................... 301/6.5 |
| 2008/0067882 A1 * | | 3/2008 | Murata ............................ 310/54 |
| 2008/0083572 A1 * | | 4/2008 | Ishida et al. ..................... 180/55 |
| 2008/0308330 A1 * | | 12/2008 | Murata ........................ 180/65.5 |
| 2009/0023529 A1 * | | 1/2009 | Sanji et al. ........................ 475/5 |
| 2009/0105918 A1 * | | 4/2009 | Kobayashi et al. ............. 701/67 |
| 2009/0118878 A1 * | | 5/2009 | Park ................................. 701/22 |
| 2009/0236158 A1 * | | 9/2009 | Sakuma et al. ............ 180/65.51 |
| 2010/0000811 A1 * | | 1/2010 | Iwano ........................ 180/65.51 |
| 2010/0140020 A1 * | | 6/2010 | Murahashi ................... 184/6.12 |
| 2010/0163319 A1 * | | 7/2010 | Murata et al. .................... 180/55 |
| 2010/0187044 A1 * | | 7/2010 | Nabeshima et al. ............ 184/26 |
| 2011/0209938 A1 * | | 9/2011 | Basadzishvili ............... 180/305 |

FOREIGN PATENT DOCUMENTS

| | | |
|---|---|---|
| JP | 2007-191027 A | 8/2007 |
| JP | 2009-012523 A | 1/2009 |
| JP | 2009-241910 A | 10/2009 |
| KR | 10-0971641 B1 | 7/2010 |
| WO | 2012/140963 A1 | 10/2012 |

* cited by examiner

*Primary Examiner* — Katy M Ebner
*Assistant Examiner* — Brodie Follman
(74) *Attorney, Agent, or Firm* — Knobbe, Martens, Olson & Bear, LLP (57) ABSTRACT

Disclosed is an in-wheel motor system including: an in-wheel motor mounted inside a wheel and generating a driving force; an oil pump provided adjacent to the in-wheel motor and supplying cooling oil into the in-wheel motor; and an oil tank provided under the in-wheel motor and collecting cooling oil discharged from the in-wheel motor, wherein the oil pump and the oil tank are arranged at a lower end of the in-wheel motor and between the in-wheel motor and a steering tie-rod in a longitudinal direction of a vehicle so as to be located at a more inner position than a knuckle in a widthwise direction of the vehicle. In the in-wheel motor system, the oil tank and the oil pump may be efficiently arranged to minimize the size of the oil tank and to improve the cooling performance.

12 Claims, 10 Drawing Sheets

IN-WHEEL MOTOR SYSTEM

CROSS-REFERENCE TO RELATED APPLICATIONS

This application claims priority to and the benefit of Korean Patent Application No. 10-2012-0127394 filed in the Korean Intellectual Property Office on Nov. 12, 2012, the entire contents of which are incorporated herein by reference.

TECHNICAL FIELD

The present disclosure relates to an in-wheel motor system, and more particularly, to a cooling structure of an in-wheel motor system capable of minimizing the size of an oil tank and improving cooling performance by efficiently arranging the oil tank and an oil pump in the in-wheel motor system having an in-wheel motor mounted therein.

BACKGROUND ART

An in-wheel motor system refers to a vehicle driving system having a motor positioned inside a wheel, the motor generating a driving force.

The in-wheel motor system includes an in-wheel motor, a cooling device to cool down the in-wheel motor, a decelerator to transmit a driving force to the wheel, a brake system to generate a braking force, a steering system to switch the direction of a vehicle, and a suspension system to support the wheel in the vehicle. In order to arrange the above-described parts in the wheel, connections between the parts are required to be integrated, and functions of the parts are required to be integrated.

In order to arrange an in-wheel motor generating a high-power driving force in the wheel, the size of the in-wheel motor is required to be reduced. In order to accomplish the size reduction, the structure of the in-wheel motor cooling device is important.

In the related art, there has been disclosed a structure which includes a mechanical oil pump and an oil tank provided inside an in-wheel motor system adjacent to a wheel driving shaft, in order to maximize the arrangement efficiency and cooling performance of the in-wheel motor system when the oil pump to circulate oil, the oil tank to store oil, an oil path through which oil circulates, and a discharge port to discharge oil are arranged to cool down the in-wheel motor.

In the in-wheel motor system according to the related art, the mechanical oil pump is located at the same position as the center of the wheel and disposed in the center of a counter gear to receive a motor driving force, in order to drive the oil pump through a rotational output of the in-wheel motor. The oil tank collecting oil is disposed over a suspension lower arm ball joint and under a decelerator so as to be located at a more inner position than a brake system in the vehicle.

In the in-wheel motor system according to the related art, a trochoid pump, a gear pump, or a vane pump which must be rotated by an external force so as to generate a discharge pressure is used as the mechanical oil pump to circulate oil. The mechanical oil pump has a problem in that the oil pump can circulate oil when the vehicle is moved forward, but cannot circulate oil when the vehicle is moved backward.

The oil discharge pressure is generated in proportion to the wheel speed. Therefore, when excessive heat is generated from the motor at a low speed (for example, when the vehicle travels on a climbing lane for a long time), the motor may not be efficiently cooled down.

Since the position of the oil tank storing oil is blocked by the surrounding parts, the oil tank cannot obtain a cooling effect by vehicle-induced wind.

The discussion in this section is only to provide background information of the invention disclosed in this application and does not constitute admission of prior art.

SUMMARY OF THE INVENTION

One aspect of the present invention provides an in-wheel motor system having an in-wheel motor mounted therein, that includes an oil tank and an oil pump which are efficiently arranged to minimize the size of the oil tank and to improve cooling performance and uses an oil pump which is independently driven regardless of the rotation speed of a wheel. Another aspect of the invention provides a vehicle including the above in-wheel motor system.

According to one embodiment, the in-wheel motor system comprises: an in-wheel motor mounted inside a wheel and configured to generate a driving force for the wheel; an oil pump configured to supply cooling oil into the in-wheel motor; and an oil tank configured to collect cooling oil discharged from the in-wheel motor. In the system, either or both of the oil pump and the oil tank are arranged at or under the lowest point of the in-wheel motor, between the in-wheel motor and a steering tie-rod, and further at a more inner position than a knuckle in a direction of the in-wheel motor's axis of rotation.

An exemplary embodiment of the present invention provides an in-wheel motor system including: an in-wheel motor mounted inside a wheel and generating a driving force; an oil pump provided adjacent to the in-wheel motor and supplying cooling oil into the in-wheel motor; and an oil tank provided under the in-wheel motor and collecting cooling oil discharged from the in-wheel motor, wherein the oil pump and the oil tank are arranged at a lower end of the in-wheel motor and between the in-wheel motor and a steering tie-rod in a longitudinal direction of a vehicle so as to be located at a more inner position than a knuckle in a widthwise direction of the vehicle.

The oil pump may be electrically powered and independently operated regardless of the speed and rotation direction of the wheel.

The in-wheel motor system may further include a controller controlling operation of the oil pump. The controller may receive temperature information of the in-wheel motor and control the operation of the oil pump based on the received temperature information.

The oil tank may include a cooling fin protruding from an outer surface thereof.

The top of the oil tank may be set at a lower level than a lower end of the rotor of the in-wheel motor.

A motor shaft of the in-wheel motor may have a hollow portion formed therein, through which cooling oil is transferred.

The in-wheel motor system may further include an oil hose connected to the hollow portion of the motor shaft from the oil pump so as to transfer the cooling oil.

The in-wheel motor system may further include a decelerator connected to the in-wheel motor to increase torque of the in-wheel motor and transferring a driving force to the wheel. The oil supplied to the in-wheel motor by the oil pump may also be supplied to the decelerator through an internal flow path of the in-wheel motor.

The cooling oil supplied into the in-wheel motor may be transferred to the oil tank along an oil flow path formed inside the knuckle through the inside of the in-wheel motor and a decelerator from a hollow portion of a motor shaft of the in-wheel motor.

The oil tank may be integrated with the knuckle.

According to exemplary embodiments of the present invention, the oil tank and the oil pump in the in-wheel motor system having the in-wheel motor mounted therein may be efficiently arranged to minimize the size of the oil tank and to improve the cooling performance. The oil pump which is independently driven regardless of the wheel rotation speed may be used to improve the cooling efficiency.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. It should be understood that although exemplary embodiment of the present invention are described hereafter, the spirit of the present invention is not limited thereto and may be changed and modified in various ways by those skilled in the art.

Figure 1:
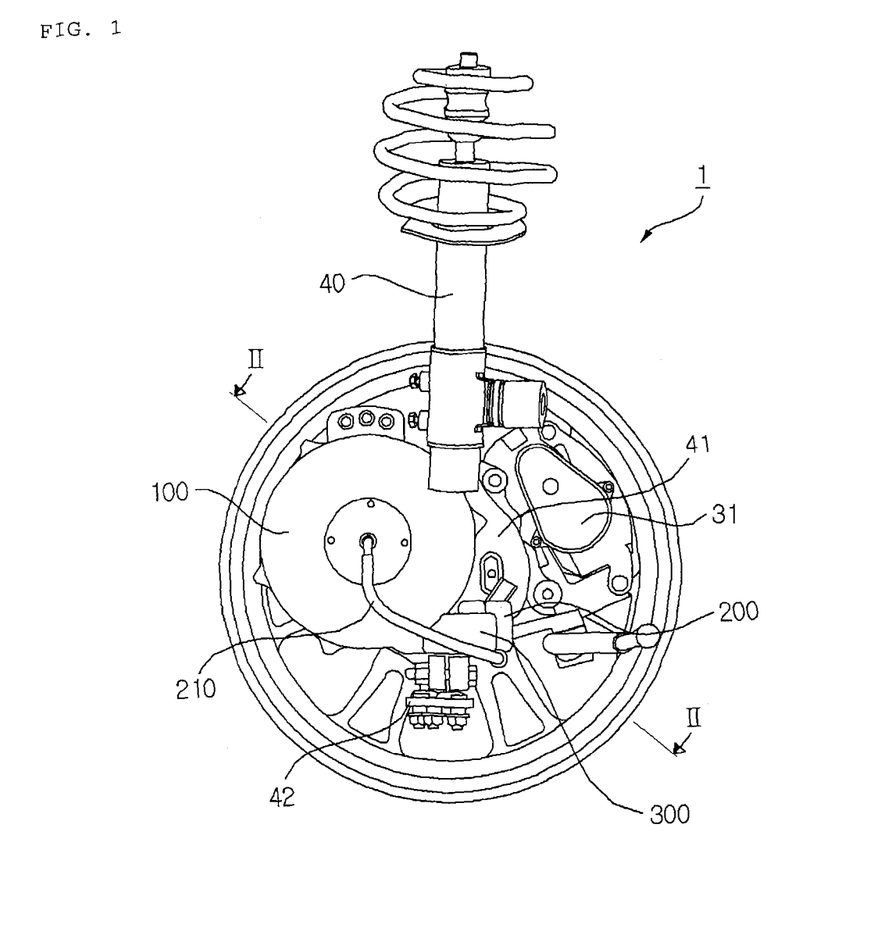
FIG. 1 is a perspective view of an in-wheel motor system according to an exemplary embodiment of the present invention, when seen from inside a vehicle to outside.
Figure 2:
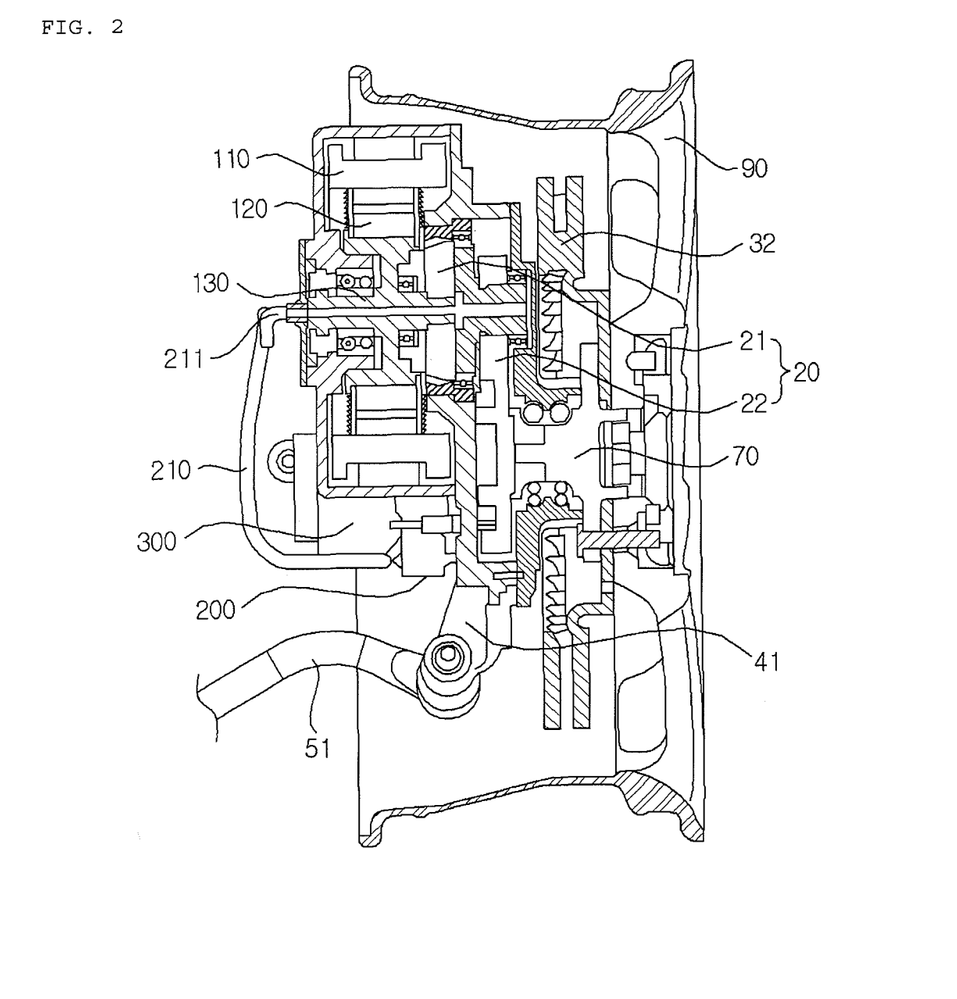
FIG. 2 is a cross-sectional view taken along line II-II of FIG. 1.
Figure 3:
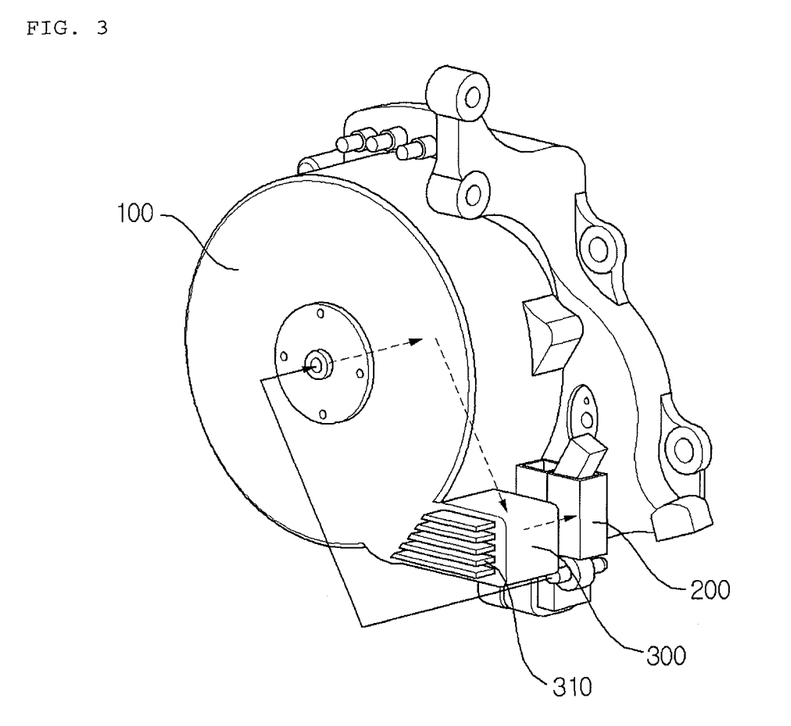
FIG. 3 is a perspective view of main parts including an in-wheel motor of FIG. 1.
Figure 4:
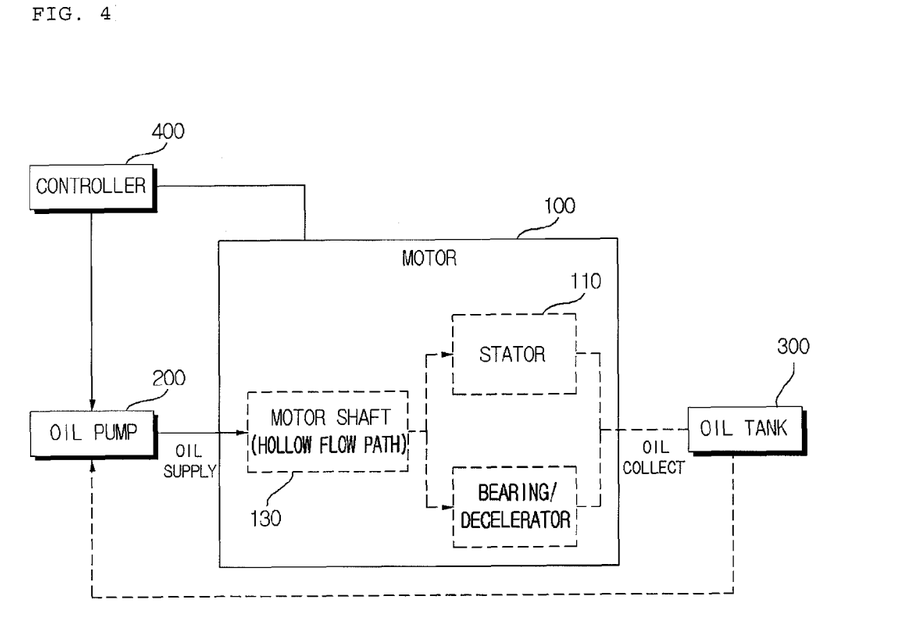
FIG. 4 is a block diagram illustrating a flow of cooling oil provided to the in-wheel motor of FIG. 1.
Figure 5:
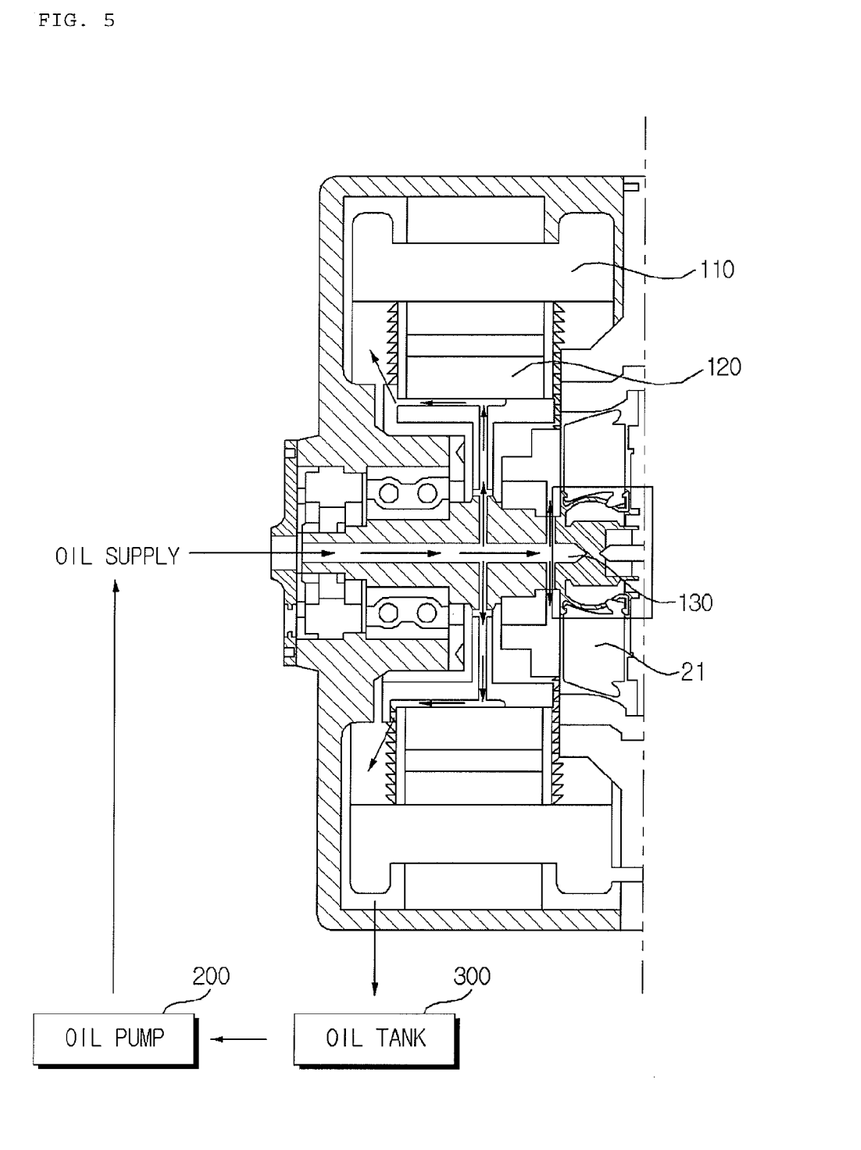
FIG. 5 is a diagram illustrating the flow of cooling oil provided to the in-wheel motor of FIG. 1.
Figure 6:
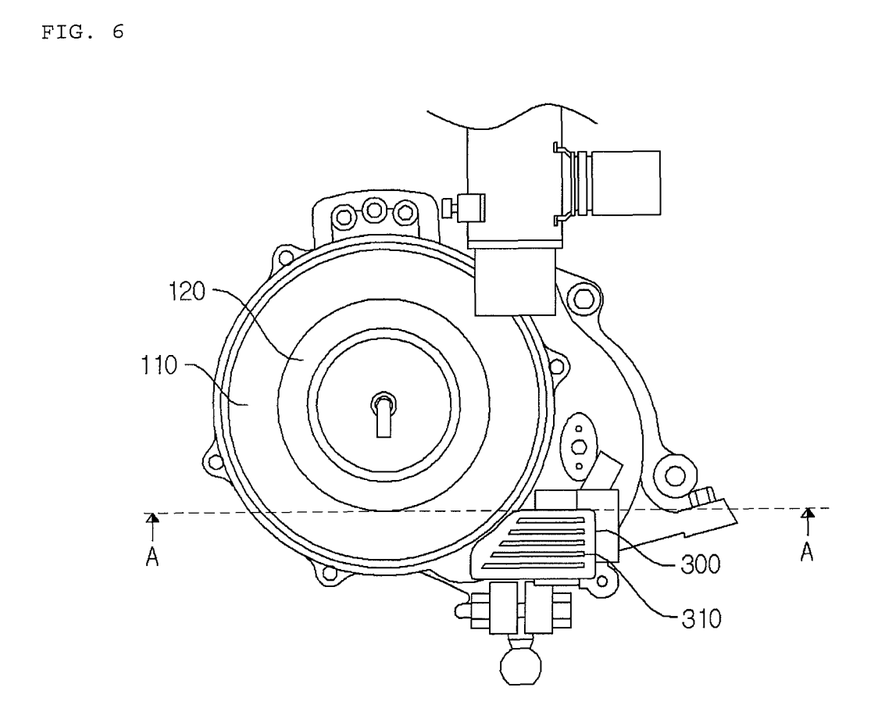
FIG. 6 is a diagram for explaining an arrangement relationship between the in-wheel motor and an oil tank of FIG. 1.

FIG. 1 is a perspective view of an in-wheel motor system according to an exemplary embodiment of the present invention, when seen from inside a vehicle to outside, FIG. 2 is a cross-sectional view taken along line II-II of FIG. 1, FIG. 3 is a perspective view of main parts including an in-wheel motor of FIG. 1, FIG. 4 is a block diagram illustrating a flow of cooling oil provided to the in-wheel motor of FIG. 1, FIG. 5 is a diagram illustrating the flow of cooling oil provided to the in-wheel motor of FIG. 1, and FIG. 6 is a diagram for explaining an arrangement relationship between the in-wheel motor and an oil tank of FIG. 1.

FIGS. 1 to 6 illustrate only main parts, in order to conceptually and clearly describe the present invention. Accordingly, the drawings may be modified in various manners, and the scope of the present invention is not limited to specific shapes illustrated in the drawings.

Referring to FIGS. 1 to 2, the in-wheel motor system 1 according to an exemplary embodiment of the present invention includes an in-wheel motor 100, an oil pump 200, and an oil tank 300. The in-wheel motor 100 is mounted inside a wheel 90 and generates a driving force. The oil pump 200 is provided adjacent to the in-wheel motor 100 and supplies cooling oil into the in-wheel motor 100. The oil tank 300 is provided under the in-wheel motor 100 so as to collect cooling oil discharged from the in-wheel motor 100.

The in-wheel motor system 1 according to the exemplary embodiment of the present invention further includes a decelerator 20 to transmit the driving force of the in-wheel motor 100 to the wheel 90, a brake system to generate a braking force, a steering system to switch the direction of the vehicle, and a suspension system 40 to support the wheel 90 in the vehicle.

The decelerator 20 includes a planet gear 21 and a counter gear 22. The planet gear 21 is connected to a motor shaft 130 of the in-wheel motor 100 and reduces the rotation speed of the in-wheel motor 100. The counter gear 22 is connected to the planet gear 21, reduces the speed of the planet gear 21, and transmits a driving force to a hub 70.

The brake system includes a disk 32 connected to the hub 70 and a caliper 31 positioned at the edge of the disk 32 and generating a braking force by pressurizing the disk 32.

The suspension system 40 includes a strut, a knuckle 41, a lower arm ball joint 42 and the like which are connected to the in-wheel motor system 1.

The steering system includes a steering tie-rod 51 connected to the knuckle 41.

The in-wheel motor system 1 including the above-described components will be described in more detail.

Referring to FIG. 2, the in-wheel motor 100 includes a stator 110, a rotor 120, and a motor shaft 130. The stator 110 receives a current to generate a magnetic field. The rotor 120 has a magnet inserted therein and rotates between the stators 110. The motor shaft 130 is connected to the rotor 120 so as to form a rotating shaft.

Referring to FIG. 5, the motor shaft 130 has a hollow portion formed in the longitudinal direction thereof. Through the hollow portion, cooling oil may be introduced. The motor shaft 130 has an oil port 211 provided at one end thereof and connected to the hollow portion, and the cooling oil is introduced into the hollow portion of the motor shaft 130 from the oil pump 200 through an oil hose 210 connecting the oil pump 200 and the oil port 211.

Referring to FIGS. 1 and 2, the oil pump 200 and the oil tank 300 are arranged at the lower end of the in-wheel motor 100 and between the in-wheel motor 100 and the steering tie-rod 51 in the longitudinal direction of the vehicle so as to be located at a more inner position than the knuckle 41 in the widthwise direction of the vehicle. According to the arrangement structure, the oil pump 200 and the oil tank 300 can obtain a cooling effect by vehicle-induced wind when the vehicle travels. Since the oil tank 300 is exposed to the outside of the system, operating oil may be easily exchanged through the oil tank 300.

The oil pump 200 is electrically powered and independently operated regardless of the speed and rotation direction of the wheel 90.

Referring to FIG. 4, the in-wheel motor system 1 according to the exemplary embodiment of the present invention further includes a controller 400 to control the operation of the oil pump 200. The controller 400 receives temperature information of the in-wheel motor 100 and controls the operation of the oil pump 200 based on the received temperature information. That is, the controller 400 controls the operation of the oil pump 200 according to the temperature of the in-wheel motor 100 regardless of the speed and rotation direction of the wheel 90, thereby improving the cooling efficiency of the in-wheel motor 100 by the cooling oil.

Referring to FIG. 3, the oil pump 300 includes a cooling fin 310 protruding from an outer surface thereof. Since the oil tank 300 is disposed at a portion where the oil tank 300 may be cooled by vehicle-induced wind as described above, the oil tank 300 may be cooled down more efficiently through the cooling fin 310.

Referring to FIG. 6, the top of the oil tank 300 is set at a lower level than the lowermost end (refer to line A) of the rotor 120 of the in-wheel motor 100. That is because the level of the cooling oil stored in the in-wheel motor 100 and the oil tank 300 needs to be managed under the lowermost end of the rotor 120 of the in-wheel motor 100. When the level of the cooling oil increases over the lowermost end of the rotor 120, the cooling oil may come in contact with the rotor 120 rotating at high speed. The contact increases the rotation resistance of the rotor 120, thereby reducing the efficiency of the in-wheel motor 100. Accordingly, the fuel efficiency of the vehicle decreases.

Due to the limitation, the cooling oil circulating through the in-wheel motor 100 is always maintained between the highest level of the oil tank 300 and the lower end of the stator 110. Accordingly, when the cooling oil is cooled down by wind introduced toward the lower end of the in-wheel motor 100 during the operation of the vehicle, that is, vehicle-induced wind, an area where the cooling oil is cooled down at the lower end of the in-wheel motor 100 is increased to improve cooling efficiency. Therefore, the size of the oil tank 300 may be reduced.

Referring to FIG. 5, the oil supplied to the in-wheel motor 100 by the oil pump 200 is also supplied to the decelerator 20 through an internal flow path of the in-wheel motor 100.

The operation of the in-wheel motor system 1 having the above-described structure will be described as follows.

When a current is applied to the stator 110 during operation of the in-wheel motor 100, a magnetic field is generated so that a torque is generated in the rotor 120 having the magnet inserted therein. The motor shaft 130 is rotated while supported by an angular contact ball bearing. The planet gear 21 connected to the motor shaft 130 primarily reduces the rotation speed of the motor, and the counter gear 22 secondarily reduces the speed of the planet gear 21 to transmit a driving force to the hub 70. The driving force rotates the disk 32 and the wheel 90 connected to the hub 70. When the vehicle is braked, the caliper 31 positioned at the edge of the disk 32 and fixed to the knuckle 41 pressurizes the disk 32 to generate a braking force.

During the operation of the in-wheel motor system 1, heat is generated from the stator 110 of the in-wheel motor 100 to which a current is applied, a motor shaft bearing, a planet gear bearing, the planet gear 21, and the counter gear 22. The oil pump 200 supplies cooling oil to the components so as to cool down the components.

Referring to FIGS. 3 to 5, the process in which oil is circulated by the oil pump 200 is performed as follows.

The cooling oil of the oil tank 300 is supplied to the hollow flow path of the motor shaft 130 by the oil pump 200, and sprayed to the decelerator 20, the bearings, and the stator 110 through a flow path inside the rotor 120 of the in-wheel motor 100. The sprayed cooling oil flows down toward the lower end of the in-wheel motor 100 due to the gravity. Then, the cooling oil is stored in the oil tank 300 through an oil collection space, and then circulated by the oil pump 200.

At this time, the oil pump 200 is driven by the controller 400 and controlled by the temperature of the in-wheel motor 100 regardless of the speed and direction of the wheel 90.

Therefore, even when the vehicle is moved backward as well as when the vehicle is moved forward, the cooling oil may be circulated to the in-wheel motor 100. Even when the vehicle travels on an inclined lane for a long time such that the coil temperature of the stator 110 rapidly increases, the cooling oil may be sprayed to the stator 110 to the maximum. Therefore, the cooling effect may be improved.

In the in-wheel motor system 1 having the in-wheel motor 100 mounted therein according to the exemplary embodiment of the present invention, the oil tank 300 and the oil pump 200 may be efficiently arranged to minimize the size of the oil tank 300, thereby increasing the cooling performance. The oil pump 200 which is independently driven regardless of the rotation speed of the wheel 90 may be used to improve the cooling efficiency.

Hereinafter, an in-wheel motor system according to another exemplary embodiment of the present invention will be described as follows with reference to the accompanying drawings. The descriptions of the same components as those of the in-wheel motor system according to the above-described exemplary embodiment of the present invention are omitted herein.

Figure 7:
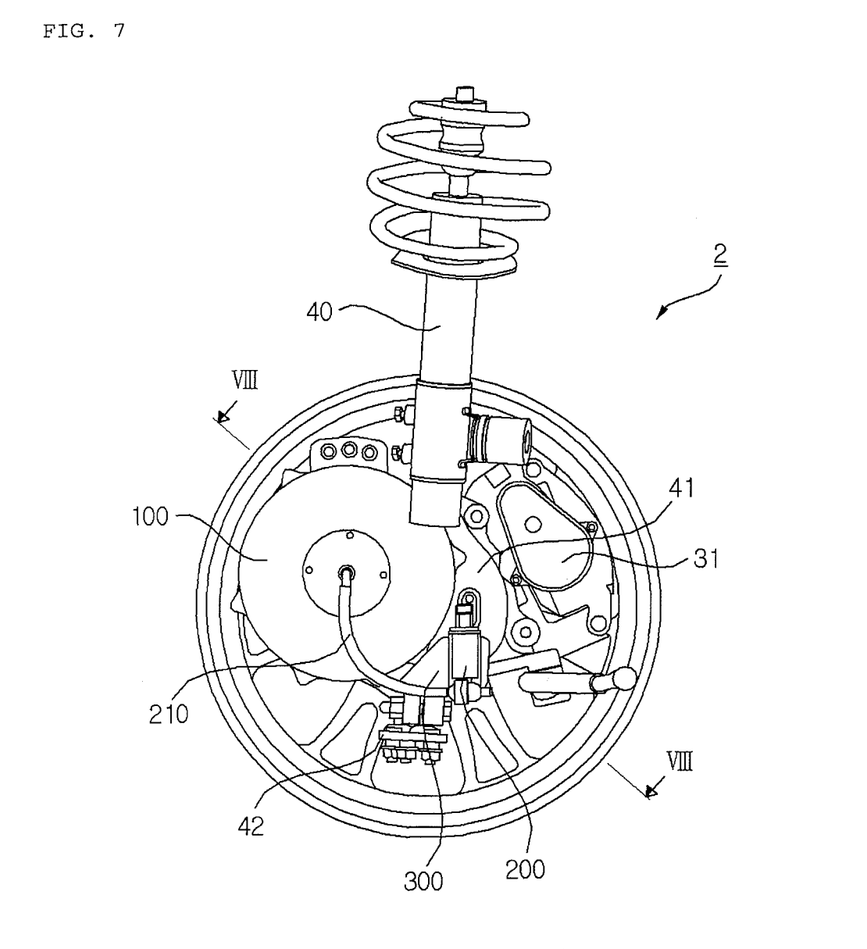
FIG. 7 is a perspective view of an in-wheel motor system according to another exemplary embodiment of the present invention, when seen from inside the vehicle to outside.
Figure 8:
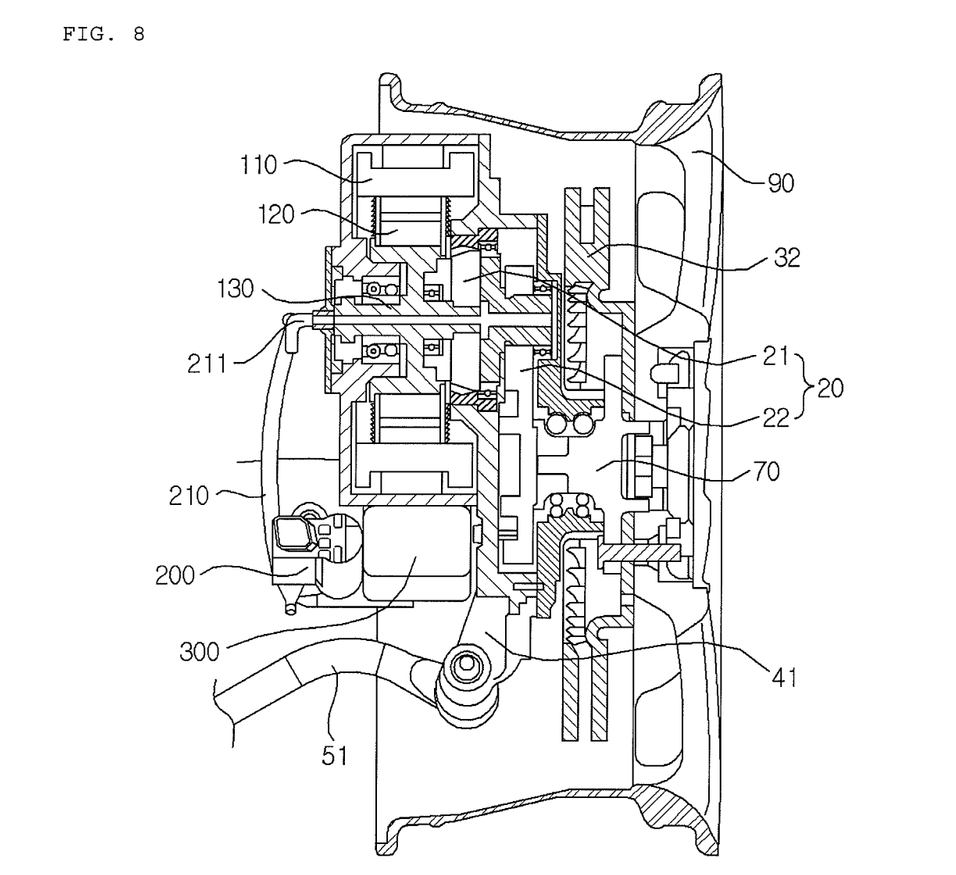
FIG. 8 is a cross-sectional view taken along line VIII-VIII of FIG. 7.
Figure 9:
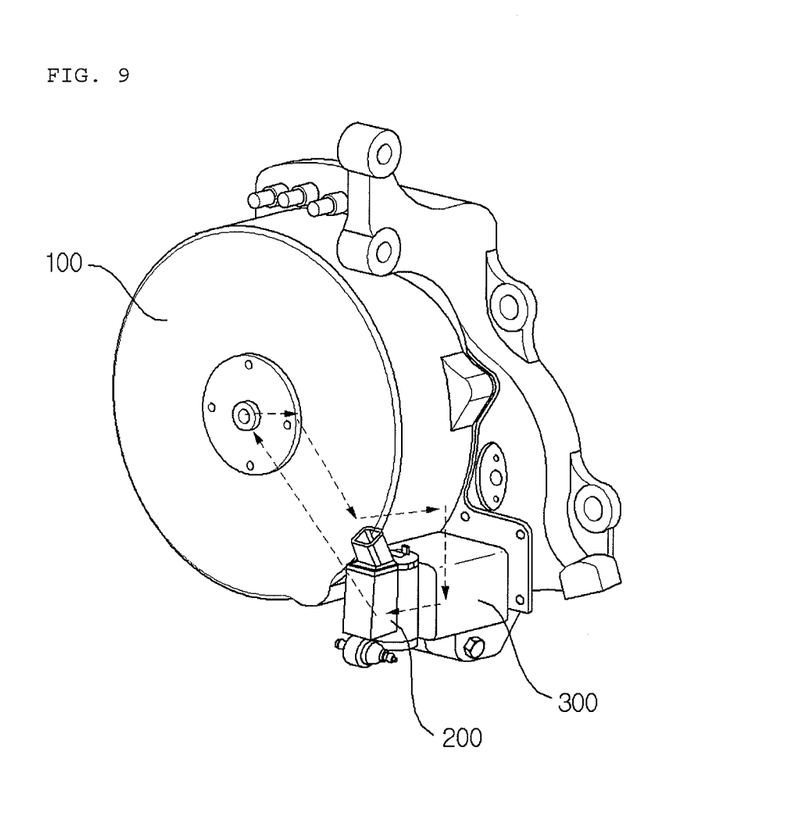
FIG. 9 is a perspective view of main parts including an in-wheel motor of FIG. 7.
Figure 10:
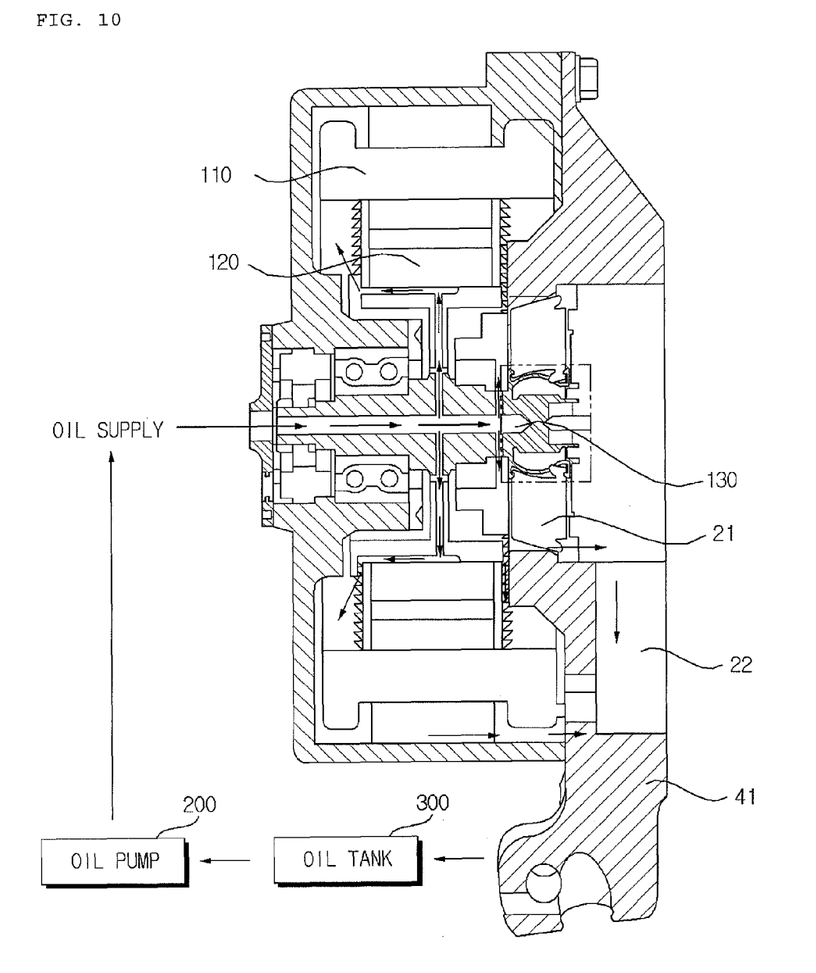
FIG. 10 is a diagram illustrating a flow of cooling oil provided to the in-wheel motor of FIG. 7.

FIG. 7 is a perspective view of an in-wheel motor system according to another exemplary embodiment of the present invention, when seen from inside the vehicle to outside, FIG. 8 is a cross-sectional view taken along line VIII-VIII of FIG. 7, FIG. 9 is a perspective view of main parts including an in-wheel motor of FIG. 7, and FIG. 10 is a diagram illustrating a flow of cooling oil provided to the in-wheel motor of FIG. 7.

In FIGS. 7 to 10, the same reference numerals as those of FIGS. 1 to 6 represent the same components, and the detailed descriptions thereof are omitted herein.

Referring to FIGS. 7 to 10, the in-wheel motor system 2 according to the exemplary embodiment of the present invention has a structure in which the positions of the oil pump 200 and the oil tank 300 are switched to each other, when compared to the in-wheel motor system 1 according to the above-described exemplary embodiment of the present invention.

In the in-wheel motor system 2 according to the present exemplary embodiment, the oil tank 300 is connected to the knuckle 41. The knuckle 41 has a flow path through which cooling oil may be transferred. The oil tank 300 connected to the knuckle 41 collects the cooling oil flowing down along the flow path inside the knuckle 41, and the cooling oil collected in the oil tank 300 by the oil pump 200 is supplied to the hollow flow path of the motor shaft 130 of the in-wheel motor 100.

The path through which the cooling oil is transferred will be described in more detail with reference to FIGS. 9 and 10. The cooling oil supplied into the in-wheel motor 100 is transferred to the oil tank 300 along the oil flow path formed inside the knuckle 41 through the inside of the in-wheel motor 100 and the decelerator 20 from the hollow flow path of the motor shaft 130 of the in-wheel motor 100.

Accordingly, the cooling oil may not only cool down the stator 110 of the in-wheel motor 100, the bearing, and the decelerator 20 including the planet gear 21 and the counter gear 22, but also serve as lubricating oil to smoothly rotate the parts.

The oil tank 300 may be integrated with the knuckle 41, in order to simplify the manufacturing process. When the oil tank 300 is integrated with the knuckle 41, the structure and arrangement of the oil tank 300 may be simplified. Accordingly, the manufacturing process may be simplified, and the cooling oil may be easily collected.

In the in-wheel motor system 2 having the in-wheel motor 100 mounted therein according to the exemplary embodiment of the present invention, the oil tank 300 and the oil pump 200 may be efficiently arranged to minimize the size of the oil tank 300, thereby improving the cooling performance. The oil pump 200 which is independently driven regardless of the rotation speed of the wheel 90 may be used to improve the cooling efficiency.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An in-wheel motor system for a vehicle, the system comprising:
    an in-wheel motor mounted inside a wheel and configured to generate a driving force for the wheel;
    an oil pump configured to supply cooling oil into the in-wheel motor; and
    an oil tank configured to collect cooling oil discharged from the in-wheel motor,
    wherein the oil pump and the oil tank are arranged at or under the lowest point of the in-wheel motor, between the in-wheel motor and a steering tie-rod, and further at a more inner position than a knuckle in a widthwise direction of the vehicle.

2. The in-wheel motor system of claim 1, wherein the oil pump is operated regardless of the speed and rotation direction of the wheel.

3. The in-wheel motor system of claim 2, further comprising:
    a controller configured to receive temperature information of the in-wheel motor and to control the operation of the oil pump based on the received temperature information.

4. The in-wheel motor system of claim 1, wherein the oil tank comprises a cooling fin protruding from an outer surface thereof.

5. The in-wheel motor system of claim 1, wherein the top of the oil tank is set at a lower level than the lowest point of the rotor of the in-wheel motor.

6. The in-wheel motor system of claim 1, wherein the in-wheel motor comprises a shaft with a hollow portion formed therein and configured to allow cooling oil to flow therethrough.

7. The in-wheel motor system of claim 6, further comprising:
    an oil hose connected to the hollow portion of the motor shaft from the oil pump so as to transfer the cooling oil to the motor shaft.

8. The in-wheel motor system of claim 1, further comprising:
    a decelerator connected to the in-wheel motor and configured to increase torque of the in-wheel motor,
    wherein the oil supplied to the in-wheel motor by the oil pump is also supplied to the decelerator through an internal flow path of the in-wheel motor.

9. The in-wheel motor system of claim 1, wherein the cooling oil is circulated along an oil flow path formed through a shaft of the in-wheel motor, a decelerator and the knuckle.

10. The in-wheel motor system of claim 1, wherein the oil tank is connected to the knuckle at the bottom of the knuckle.

11. The in-wheel motor system of claim 1, wherein the oil tank is integrated with the knuckle.

12. A vehicle comprising an in-wheel motor system of claim 1.

* * * * *